United States Patent [19]

Inoue et al.

[11] 4,344,408
[45] Aug. 17, 1982

[54] CYLINDER HEAD, SPARK PLUG, AND PISTON CONFIGURATION

[75] Inventors: Tokuta Inoue, Mishima; Kiyoshi Nakanishi; Mutsumi Kanda, both of Susono; Masahiko Nakada, Okazaki; Toshiharu Matsuura, Toyota, all of Japan

[73] Assignee: Toyota Jidosha Kogyo Kabushiki Kaisha, Toyota, Japan

[21] Appl. No.: 101,238

[22] Filed: Dec. 7, 1979

[30] Foreign Application Priority Data

Mar. 5, 1979 [JP] Japan .................... 54-25363

[51] Int. Cl.³ ............................. F02B 23/08
[52] U.S. Cl. .................... 123/661; 123/279; 123/262
[58] Field of Search ............... 123/657, 661, 662, 667, 123/279, 262, 263

[56] References Cited

U.S. PATENT DOCUMENTS 2,749,899 6/1956 Mitchell ............................. 123/279
2,991,780 7/1961 Brien ................................. 123/661

FOREIGN PATENT DOCUMENTS 2751993 5/1979 Fed. Rep. of Germany ...... 123/661
1204434 9/1970 United Kingdom ............... 123/661

OTHER PUBLICATIONS

Morrell et al.; "Oliver's New 1800 Tractor Engine"; SAE Journal, vol. 69, No. 10, Oct. 1961; pp. 62-68.

*Primary Examiner*—Craig R. Feinberg
*Attorney, Agent, or Firm*—Kenyon & Kenyon

[57] ABSTRACT

In an internal combustion engine, the combination of a cylinder head with a plane lower surface and a cavity, a piston with a plane upper surface and a cavity, the plane surfaces of the piston and the cylinder head cooperating to form a squish area on one side of the cylinder bore, and a spark plug protruding into the combustion chamber defined by the cavities so that its igniting tip lies substantially in the squish plane on the other side of the cylinder bore.

10 Claims, 9 Drawing Figures

CYLINDER HEAD, SPARK PLUG, AND PISTON CONFIGURATION

BACKGROUND OF THE INVENTION

The present invention relates to a cylinder head and piston configuration of an internal combustion engine, and more particularly relates to such a configuration which incorporates a squish area.

In designing combustion chamber configurations, the requirements of good fuel consumption, stable combustion, and good exhaust gas quality must all be considered. In order to reduce fuel consumption, it is effective to increase the compression ratio. However, in the case of a usual combustion chamber, increase of the compression ratio is limited by the occurrence of abnormal combustion such as knocking. In order to achieve stable combustion, it is effective to increase the turbulence of the mixture gas in the combustion chamber, and to make the combustion chamber compact. A conventional wedge-shaped combustion chamber provides quite good combustion characteristics. However, as a matter of experience, it is found that if an engine with a wedge-shaped combustion chamber is operated with a rather lean air-fuel mixture, or with exhaust gas recirculation, in order to improve the qualities of the exhaust gases and reduce the emission of harmful exhaust gas components, combustion becomes disturbed and uneven, and the operability of the engine deteriorates so far that, if the engine, for example, is used in a vehicle, the drivability of the vehicle is poor.

SUMMARY OF THE INVENTION

Therefore, it is an object of the present invention to provide a configuration for the cylinder head and the piston of an internal combustion engine which provides a combustion chamber in which the conflicting requirements of good fuel economy, stable combustion, and low emissions of pollutants can be more satisfactorily reconciled than has heretofore been possible.

According to the present invention, this and other objects are accomplished, in an internal combustion engine having a cylinder bore, by the combination of a cylinder head which closes an end of said cylinder bore and has a plane surface facing the bore, a piston with a plane end surface opposing the cylinder head and which reciprocates within the bore to such an extent that at one end of its travel its said plane end surface comes in close proximity to said plane surface of the cylinder head, and a spark plug with an igniting tip; the piston being formed with a piston depression at least partly delimited by said plane end surface of the piston, and the cylinder head being formed with a cylinder head depression at least partly delimited by said plane surface of the cylinder head and at least partially opposing said piston depression; the spark plug being mounted in the cylinder head so as to project into the cylinder head depression with its igniting tip substantially in said plane surface of the cylinder head in a position offset from the axis of the cylinder bore; said plane surface of the cylinder head and said plane end surface of the piston defining between them a squish area located primarily on the opposite side of the axis of the cylinder bore from said igniting tip of the spark plug.

According to this construction, the squish stream generated by this squish area is directed onto the igniting tip of the spark plug, and, accordingly, micro-turbulence of the mixture gas around the region of the igniting tip is much increased, which aids the flame propagation therefrom. Thereby, tendency to knock is greatly reduced, and thermodynamic efficiency of the engine is increased.

It is considered, as a particular feature of the present invention, that the volume of the larger of the depressions in the piston and the cylinder head should be no more than fifty percent larger than the smaller, and, as a further particular feature, that they should be symmetrically formed with respect to one another, about the squish plane. This aids further the symmetrical propagation of the flame front, which improves stability of combustion.

It is preferable, as another particular feature of the present invention, that the circumferences of the cylinder head cavity and the piston cavity should coincide with one another when the piston is at its top dead center, at least where they delimit the squish area. This ensures that the squish stream should not blow along the surface of the piston or of the cylinder head, but directly out into the combustion chamber, without its motion being damped by viscous resistance caused by passing close to a parallel surface. This also improves cooling of the exhaust valve, by microturbulences in the squish stream passing underneath it, and suppresses the temperature rise of the end gas existing in proximity of the exhaust valve, thus further preventing the occurrence of knocking. In order further to aid the direct squirting-out of the squish stream, it is effective, according to a further particular feature of the present invention, for the wall of the piston depression, where the piston depression meets the part of the plane upper surface of the piston which defines the squish area, to be substantially perpendicular to said plane upper surface. This further ensures good separation of the squish stream from the piston surface.

Further, according to another feature of the present invention, in addition to the squish area defined between the plane surfaces of the piston and the cylinder head on the opposite side of the axis of the cylinder bore from the igniting tip of the spark plug, a second squish area may be defined on the other side of the axis of the cylinder bore which is opposite to the position where the firstmentioned squish area is defined.

Further, according to another particular feature of the present invention, the ratio of the areas of the first and the second squish areas may be approximately four.

By the provision of these two squish areas, the squish streams coming from them meet in the neighborhood of the spark plug's igniting tip, and collide there. This further increases microturbulence in this area, which occurs over a plane generally parallel to the axis of the cylinder and containing the igniting tip of the spark plug and perpendicular to the shortest line joining that tip to the axis of the cylinder. This further improves the stability of combustion.

BRIEF DESCRIPTION OF THE DRAWINGS

The present invention will become more fully and clearly understood from the following description of several preferred embodiments thereof, which should be read in conjunction with the accompanying drawings. It should be clearly understood, however, that this description of embodiments, and the drawings, are all given for the purposes of explanation only, and are not to be taken in any way as limiting the scope of the present invention, which is to be defined solely by the legitimate and proper scope of the appended claims. In the drawings:

DESCRIPTION OF THE PREFERRED EMBODIMENTS

Figure 1:
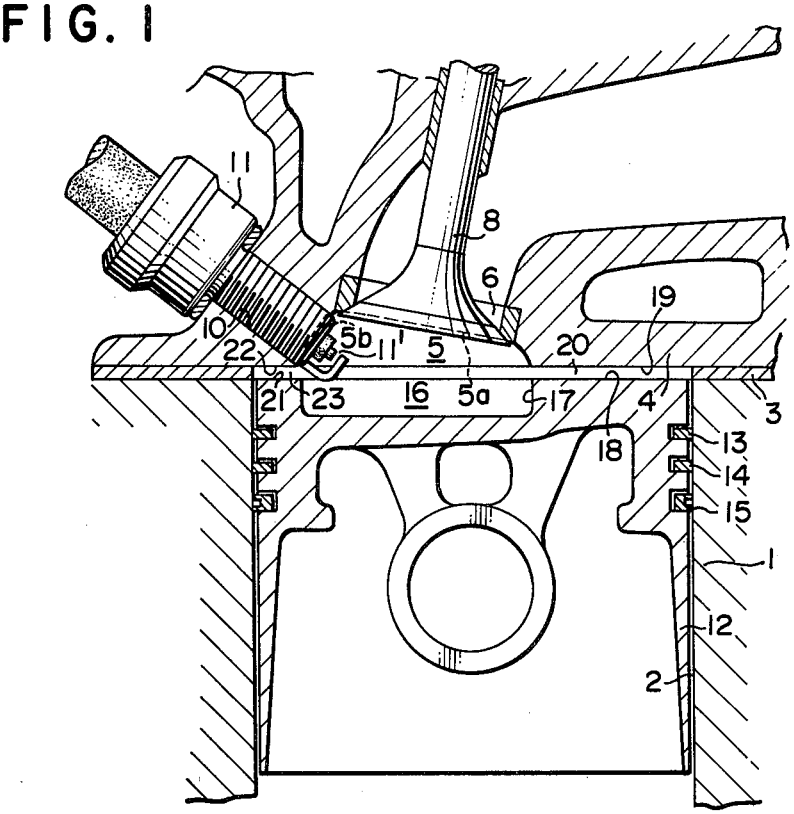
FIG. 1 is a longitudinal sectional view, taken along the line I—I in FIG. 2, of the cylinder head and piston of an internal combustion engine, acccording to a first preferred embodiment of the present invention.
Figure 2:
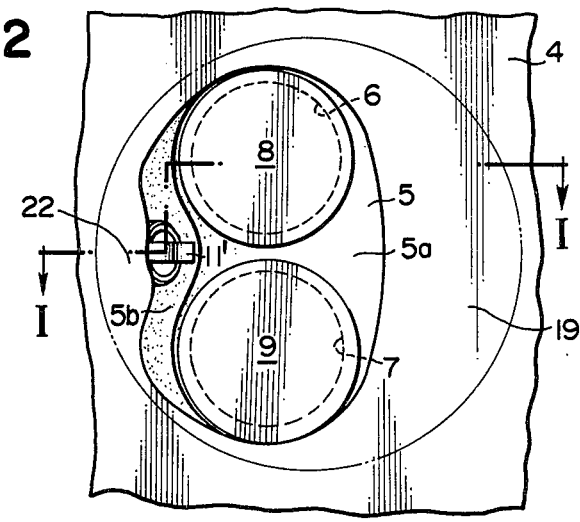
FIG. 2 is a bottom plan view of the cylinder head of the engine of FIG. 1.
Figure 3:
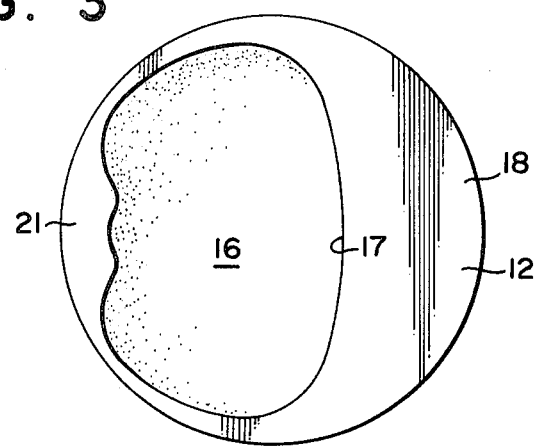
FIG. 3 is a plan view of the piston of the engine of FIG. 1.

Referring to FIGS. 1–3, showing a first preferred embodiment of the present invention, in a cylinder block 1 is bored a cylinder bore 2, and on the upper plane surface of the cylinder block 1 is fitted a gasket 3, on which a cylinder head 4 is fixed, so as, in the usual way, to close the upper end of the bore 2.

In the cylinder bore 2 slides a piston 12, which is fitted with piston rings 13, 14, and 15.

The cylinder head 4 is formed with a head cavity 5, which in the shown embodiment is a wedge-shaped cavity offset to one side from the axis of the cylinder bore 2, namely, in the section shown in FIG. 1, to the left hand side. The lower face of the cylinder head surrounding this cavity and opposed to the cylinder bore is substantially in the upper plane of the gasket 3, i.e. is parallel to and slightly displaced from the plane of the top of the cylinder block 1.

Further, the upper surface of the piston 12 is formed with a piston cavity 16, the rest of said upper surface being plane. This cavity is offset to the same side of the axis of the cylinder bore 2 as is the cavity 5 in the cylinder head 4. In the shown embodiment, the circumferences of these cavities 5 and 16 substantially coincide around their entire extent. Further, according to the present invention, when the piston 12 reciprocates in the normal manner in the cylinder bore 2 by the action of a connecting rod, not shown, to which it is attached, it moves so far upwards that at the top dead center of its reciprocating motion its upper surface reaches substantially the lower plane of the gasket 3, and therefore substantially meets the lower surface of the cylinder head 4. When the piston is in this position, as shown in FIG. 1, the combustion chamber, i.e. the space into which fuel-air mixture is confined, is substantially composed of the combination of the two cavities 5 and 16, and the space which previously existed between the upper plane piston surface and the lower plane head surface is substantially squeezed out of existence, thus producing the well-known "squish" effect.

On its one side (the right hand side in FIG. 1) the cavity 5 is formed with a roof which has a fairly gentle slope 5a, and on its other side (the left hand side in FIG. 1) the cavity 5 is formed with a roof which has a fairly steep slope 5b. In the gentle slope roof 5a open an inlet port 6 and an exhaust port 7, which are respectively controlled by an inlet valve 8 and an exhaust valve 9. Further, in the steep slope roof 5b of the cavity 5 there opens an ignition plug hole 10, the axis of which intersects the axis of the cylinder bore 2.

Into this hole 10 is screwed an ignition plug 11, whose igniting tip 11'—that is, the point at which the spark occurs, approximately—projects into the combustion chamber.

According to the present invention, this tip 11' is substantially located in the plane of the gasket 3, that is, in the plane defined by the lower plane surface of the cylinder head 4 and the upper plane surface of the piston 12, at their closest approach, when the piston 12 is at the top dead center of its reciprocating motion. This will hereinafter be called the squish plane.

Therefore, when the piston is at the top dead center of its reciprocating motion, the combustion chamber, which is substantially formed of the cavity 5 and the cavity 16, is divided by the squish plane. According to a particular aspect of the present invention, the volumes of these cavities 5 and 16 are substantially equal, in the shown embodiment. In any case, it is desirable and preferable that the larger of them should not be more than 50% larger than the smaller.

In this embodiment, the side wall of the piston cavity 16 is formed as a substantially perpendicular wall 17, as may be seen in FIG. 1. The surfaces 18 and 19, which, as may be seen from FIGS. 2 and 3, are respectively the right hand part in the drawings of the upper surface of the piston, and the right hand part in the drawings of the lower surface of the cylinder head 4, and are opposed, define between them a first squish area, or a main squish area, 20, which is on the side of the axis of the cylinder bore 2 which is opposite to the position of the spark plug tip 11', that is, on the side of the gentle slope roof 5a of the cylinder head cavity 5. On the other hand, the surfaces 21 and 22, which are respectively the left hand part in the drawings of the upper surface of the piston and the left hand part in the drawings of the lower surface of the cylinder head, and are opposed, define between them a second squish area 23, which is substantially smaller than the first squish area 20, and which is on the same side of the axis of the cylinder bore 2 as the position of the spark plug tip 11, that is, on the side of the steep slope roof 5b of the cylinder head cavity 5. According to a particular aspect of the present invention, the proportion between the areas of the first and the second squish areas is about 4:1.

When the engine incorporating this structure operates according to the normal Otto cycle, as the piston 12 rises, mixture gas in the combustion chamber is compressed. When the piston 12 rises so as to approach its top dead center, then mixture gas in the first and second squish areas 20 and 23 is compressed much more strongly than the rest of the mixture gas in the cylinder, as these squish areas become very small in their vertical dimension, and thereby this mixture gas is squirted sideways into the main combustion chamber, which, at the top dead center of the piston, as mentioned above, is substantially formed by the piston cavity 16 and the cylinder head cavity 5. That is, squish streams are generated. These squish steams cause turbulence in the main combustion chamber.

Because, according to the present invention, the tip 11' of the spark plug 11 is located substantially in the squish plane, this squish stream impinges on the spark plug tip 11', and the microturbulences in the mixture gas caused by the squish stream in the neighborhood of the spark plug tip 11' are very effective for improving ignition and combustion performance of the engine.

Further, because, according to the aforementioned particular aspect of the present invention, the proportion between of the areas of the first and second squish areas 20 & 23 is about 4:1, as a matter of course the squish stream from the first squish area 20 will be much more powerful than that from the second squish area 23. Further, because the spark plug tip 11' is much closer to the second squish area 23 than it is to the first squish area 20, it is located approximately at the position where the two squish streams come into collision. Thereby, the strongest microturbulences in the mixture gas occur roughly on a plane vertical and perpendicular to the drawing paper in FIG. 1 and containing the spark plug tip 11'. This is again very effective for improving ignition and combustion.

In this engine, ignition timing is preferably set in the range in the crank angle diagram of 40°–10° before piston top dead center, and particularly is preferably set in the range of 25°–15° before top dead center.

Further, because, according to another particular feature of the present invention, the volumes of the cylinder head cavity 5 and the piston cavity 16 are approximately equal, the spreading of the flame front from the spark plug tip 11' is fairly symmetrical about the squish plane, and this aids smooth and stable combustion.

Further, because in this embodiment the circumferences of the cylinder head cavity 5 and the piston cavity 16 are substantially in alignment with one another at their boundaries which define the edges of the squish areas, and also because the wall 17 of the piston cavity 16 is substantially perpendicular to the squish plane where it meets it, the squirting-out squish mixture gas squirts clear of both the cylinder head and the surface of the piston, rather than following the one or the other of them and travelling along its surface, and is ejected directly into the main combustion chamber without its speed being damped by viscous resistance caused by moving close to or along one of these surfaces.

Because the microturbulances in the mixture gas occur also in the space under the exhaust valve, local temperature rise of this mixture gas due to the hot exhaust valve is avoided, while flame propagation from the ignition plug is made easier, whereby the exhaust valve is better cooled, and the occurrence of knocking is suppressed.

When the piston moves past its top dead center and descends, after the mixture gas has been ignited by the ignition plug, the mixture gas is sucked into the squish areas 20 and 23, in the reverse manner to the effect which happens when the piston rises. This also aids smooth combustion. Again, because the ignition plug is in the squish plane, the inverse squish streams again cause considerable turbulence in the neighborhood of the ignition plug, and further, because the velocities of the propagation of the flame relative to the mixture gas and of the inverse squish stream are in the same direction, the apparent speed of flame propagation, which is their vector sum, becomes higher. As a result, rapid combustion occurs.

Therefore, it is possible to operate an engine embodying the present invention at an air/fuel ratio substantially leaner than has been heretofore utilized in practice, without causing undue emission of noxious exhaust gas components. Further, exhaust gas recirculation can be performed in these conditions without impeding stable combustion. Due to the rapid combustion provided by the present invention, the tendency towards abnormal combustion such as knocking can be reduced, and as a result the compression ratio of the engine can be increased. Thereby, a very substantial improvement in power output and fuel consumption can be available.

Figure 4:
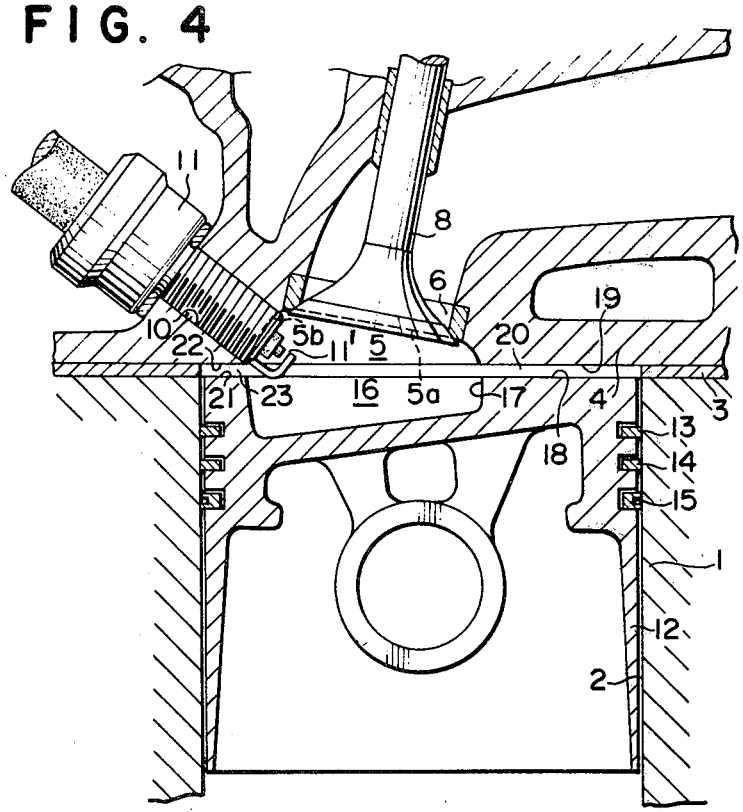
FIG. 4 is a view similar to FIG. 1, showing a second embodiment.

FIG. 4 is a view similar to FIG. 1, showing a second embodiment of the present invention. In this figure, parts which correspond to similar parts in FIGS. 1–3, and have similar functions, are designated by the same reference numerals. In this embodiment, the piston cavity 16 is formed substantially symmetrically to the cylinder head cavity 5, about the squish plane; in other words, on its right hand side as seen in the figure it is formed with a gentle slope floor opposing the gentle slope roof 5a, and on its left hand side as seen in the figure it is formed with a steep slope floor opposing the steep slope roof 5b.

In this embodiment, because the symmetry between the piston cavity 16 and the cylinder head cavity 5 is more pronounced than in the embodiment of FIGS. 1–3, the spreading of the flame front is more symmetrical. Further, due to the fact that the space around the ignition plug tip 11'—i.e., the vertical dimension of the main combustion chamber at the position of the ignition plug tip—is large, the initial flame area after ignition is large. This, again, aids stable combustion.

Figure 5:
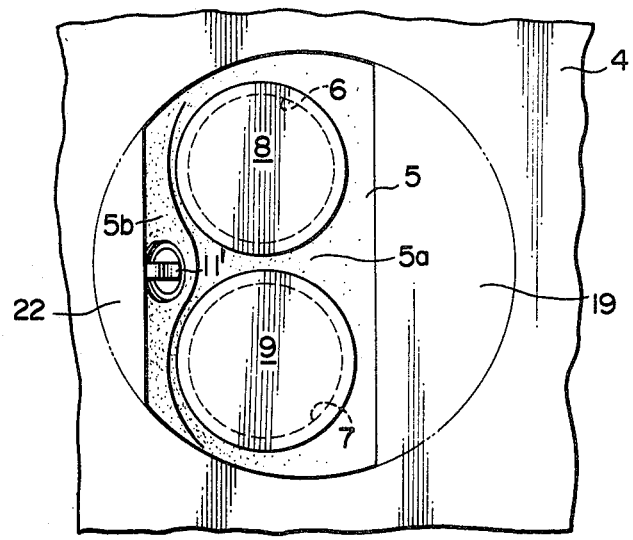
FIGS. 5 and 6 are views similar to FIGS. 2 and 3 respectively, showing a third embodiment.
Figure 6:
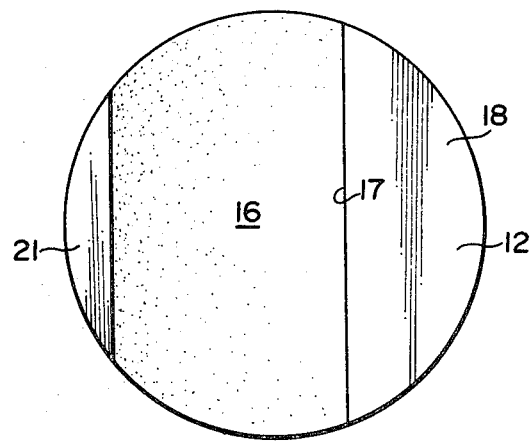

FIGS. 5 and 6 show respectively the cylinder head and the piston for a third embodiment of the present invention. Again, parts which correspond to parts shown in previous figures are designated by the same reference numerals. In this embodiment, the first and second squish areas are separate, are not joined by any such peripheral squish area as was present in the first embodiment, and are delimited on their non-cylinder-wall sides by straight lines. Again in this embodiment, although it is not shown in the figures, the tip of the ignition plug 11' is substantially in the squish plane. Thereby the same advantages are reaped.

Figure 7:
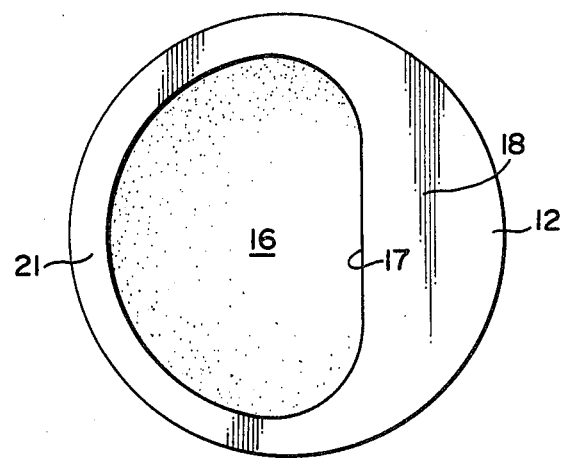
FIG. 7 is a view similar to FIGS. 3 and 6, showing a fourth embodiment.

FIG. 7 shows the piston for a fourth embodiment of the present invention to which the cylinder head, not shown, corresponds and conforms. Again, corresponding parts bear the same reference numbers as in FIGS. 1–3. In this embodiment, the main or first squish area is delimited on its non-cylinder-wall side by a straight line, and the second squish area is part of a peripheral squish area extending all around the remainder of the piston crown. The same advantages are reaped as with the other embodiments.

Figure 8:
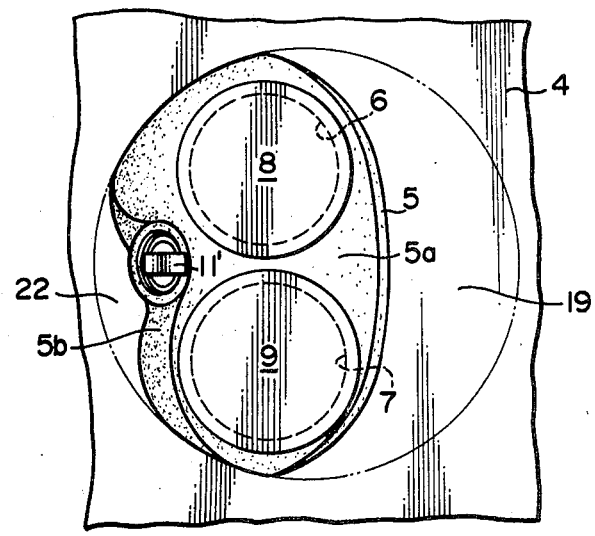
FIG. 8 is a view similar to FIGS. 2 and 5, showing a fifth embodiment.

FIG. 8 shows from underneath the cylinder head for a fifth embodiment of the present invention. Again, like parts are designated by like reference numerals. In this embodiment, the combustion chamber cavity, formed substantially, at top dead center, by the cylinder head cavity 5 and the piston cavity 16, is enlarged so as completely to surround the inlet valve 6. This promotes intake efficiency by reducing the masking effect of the wall on the intake flow. In this case, the second squish area 23 is only provided near the exhaust valve 7.

Figure 9:
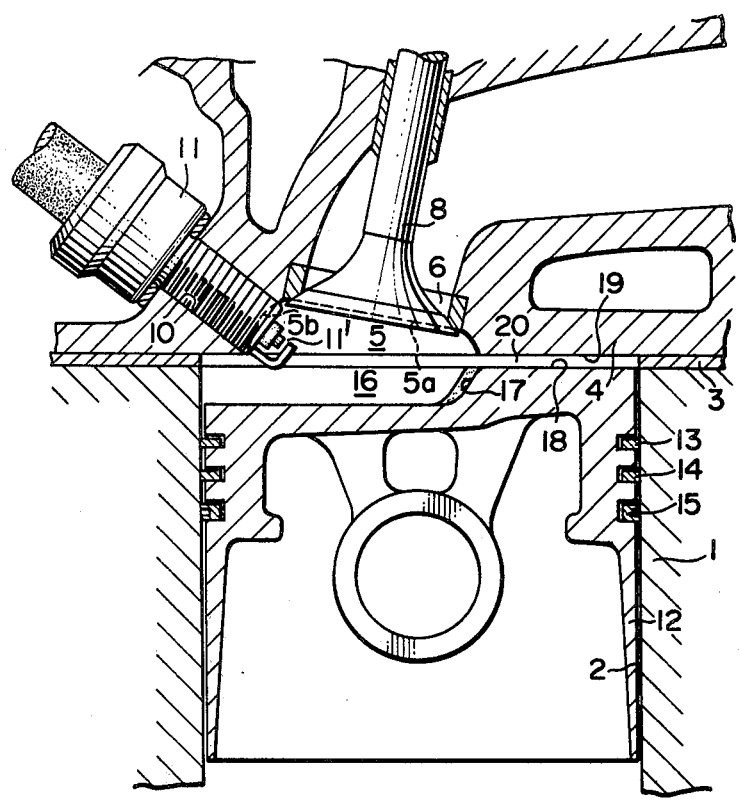
FIG. 9 is a view similar to FIGS. 1 and 4, showing a sixth embodiment.

Although the provision of the second squish area is not essential to the present invention, it is desirable and preferred. FIG. 9, on the other hand, shows a sixth embodiment of the present invention which has only the first or main squish area. Again, like parts are designated by like reference numerals. In this sixth embodiment the upper surface of the piston is formed as two upper and lower surfaces separated by a step which in this embodiment is not so very steep, so that the circumference thereof is not all in one plane perpendicular to the piston's axis. Thus, only the upper surface 18 defines a squish area, the main or first squish area 20, on the side of the cylinder's axis remote from the spark plug tip 11', which, again, is substantially in the squish plane. This embodiment again provides a good combination and performance.

The shown embodiments have all involved wedge-shaped cylinder heads; however, this is not an essential point of the present invention, which is equally applicable to an engine with a bathtub-shaped cylinder head. Although, therefore, the present invention has been shown and described in terms of several preferred embodiments thereof, it should not be considered as limited to these, however, or mere and simple generalizations, or other detailed embodiments. Yet further variations could be made, by one skilled in the art, to the details of any particular embodiment. Therefore it is desired that the scope of the present invention, and of the monopoly which is sought to be granted by Letters Patent, should be defined, not by any perhaps purely fortuitous details of the shown embodiments, or by the drawings, but solely by the legitimate and proper scope of the appended claims.

We claim:

1. In an internal combustion engine having a cylinder bore:

the combination of a cylinder head which closes an end of said cylinder bore and has a plane surface facing the bore, a piston with a plane end surface opposing the cylinder head which reciprocates within the bore to such an extent that at one end of its travel its said plane end surface comes in close proximity to said plane surface of the cylinder head, at least an inlet valve having a valve head, and a spark plug with an igniting tip;

the piston being formed with a piston depression delimited by said plane end surface of the piston, and the cylinder head being formed with a cylinder head depression at least partly delimited by said plane surface of the cylinder head and at least partially opposing said piston depression, the volume of either one of the piston depression and the cylinder depression being not more than 50 percent greater than the volume of the other;

the spark plug being mounted in the cylinder head so as to project into the cylinder head depression with its igniting tip substantially in said plane surface of the cylinder head in a position offset from the axis of the cylinder bore, said valve head being inclined upwardly toward the side of said cylinder head depression where said spark plug is located; and said plane surface of the cylinder head and said plane end surface of the piston defining between them a main squish area of crescent shape when the piston is at said one end of its travel, said main squish area being generally on the opposite side of the axis of the cylinder bore from said igniting tip of the spark plug.

2. A combination as in claim 1, wherein the part of the piston depression which joins to the part of said plane end surface of the piston which defines said squish area is substantially perpendicular to said plane end surface of the piston.

3. In an internal combustion engine having a cylinder bore:

the combination of a cylinder head which closes an end of said cylinder bore and has a plane surface facing the bore, a piston with a plane end surface opposing the cylinder head which reciprocates within the bore to such an extent that at one end of its travel its said plane end surface comes in close proximity to said plane surface of the cylinder head, at least an inlet valve having a valve head, and a spark plug with an igniting tip;

the piston being formed with a piston depression at least partly delimited by said plane end surface of the piston, and the cylinder head being formed with a cylinder head depression at least partly delimited by said plane surface of the cylinder head and at least partially opposing said piston depression, the volume of either one of the piston depression and the cylinder head depression being not more than 50 percent greater than the volume of the other;

the spark plug being mounted in the cylinder head so as to project into the cylinder head depression with its igniting tip substantially in said plane surface of the cylinder head in a position offset from the axis of the cylinder bore, said valve head being inclined upwardly toward the side of said cylinder head depression where said spark plug is located;

and said plane surface of the cylinder head and said plane end surface of the piston defining between them a first squish area, generally on the opposite side of the axis of the cylinder bore as said igniting tip of the spark plug, when the piston is at said one end of its travel said first squish area being substantially larger than said second squish area.

4. A combination as in claim 3, wherein the ratio of the areas of said first and second squish areas is approximately four.

5. A combination as in claim 3, wherein the part of the piston depression which joins to the part of said plane end surface of the piston which defines said first squish area is angled substantially perpendicularly to said plane end surface of the piston.

6. A combination as in claim 4, wherein the piston depression and the cylinder head depression are both generally offset from the axis of the cylinder bore on the same side as the igniting tip of the spark plug.

7. A combination as in claim 3, wherein the depressions in the cylinder head and the piston are formed substantially symmetrically to one another.

8. A combination as in any one of claims 1, 2 or 7, wherein the contours of the boundary between the part of the plane surface of the piston which defines the squish area, and the piston depression, and the boundary between the part of the plane surface of the cylinder head which defines the squish area, and the cylinder head depression, substantially coincide when the piston is at said one end of its travel.

9. A combination as in any one of claims 3 or 5 or 6, wherein the cylinder head cavity is of a wedge shape, having a gently sloping roof on the side of the first squish area, and a steeply sloping roof on its other side.

10. A combination as in claim 3 or 5 or 4 or 6 or 7 wherein the contours of the boundary between the part of the plane surfaces of the piston which define the squish areas, and the piston depression, and the boundary between the part of the plane surfaces of the cylinder head which define the squish areas, and the cylinder head depression, substantially coincide with the piston is at said one end of its travel.

* * * * *

UNITED STATES PATENT AND TRADEMARK OFFICE
CERTIFICATE OF CORRECTION

PATENT NO. : 4,344,408

DATED : August 17, 1982

INVENTOR(S) : Tokuta Inoue, et al.

It is certified that error appears in the above—identified patent and that said Letters Patent is hereby corrected as shown below:

Col. 8, line 41, change "4" to --5--.

Col. 8, line 56, change "or" second occurrence to -- - --.

Signed and Sealed this

Second Day of November 1982

[SEAL]

Attest:

GERALD J. MOSSINGHOFF

Attesting Officer

Commissioner of Patents and Trademarks